April 26, 1938.　　　G. I. PHILLIPS　　　2,115,082
NET
Filed June 14, 1935
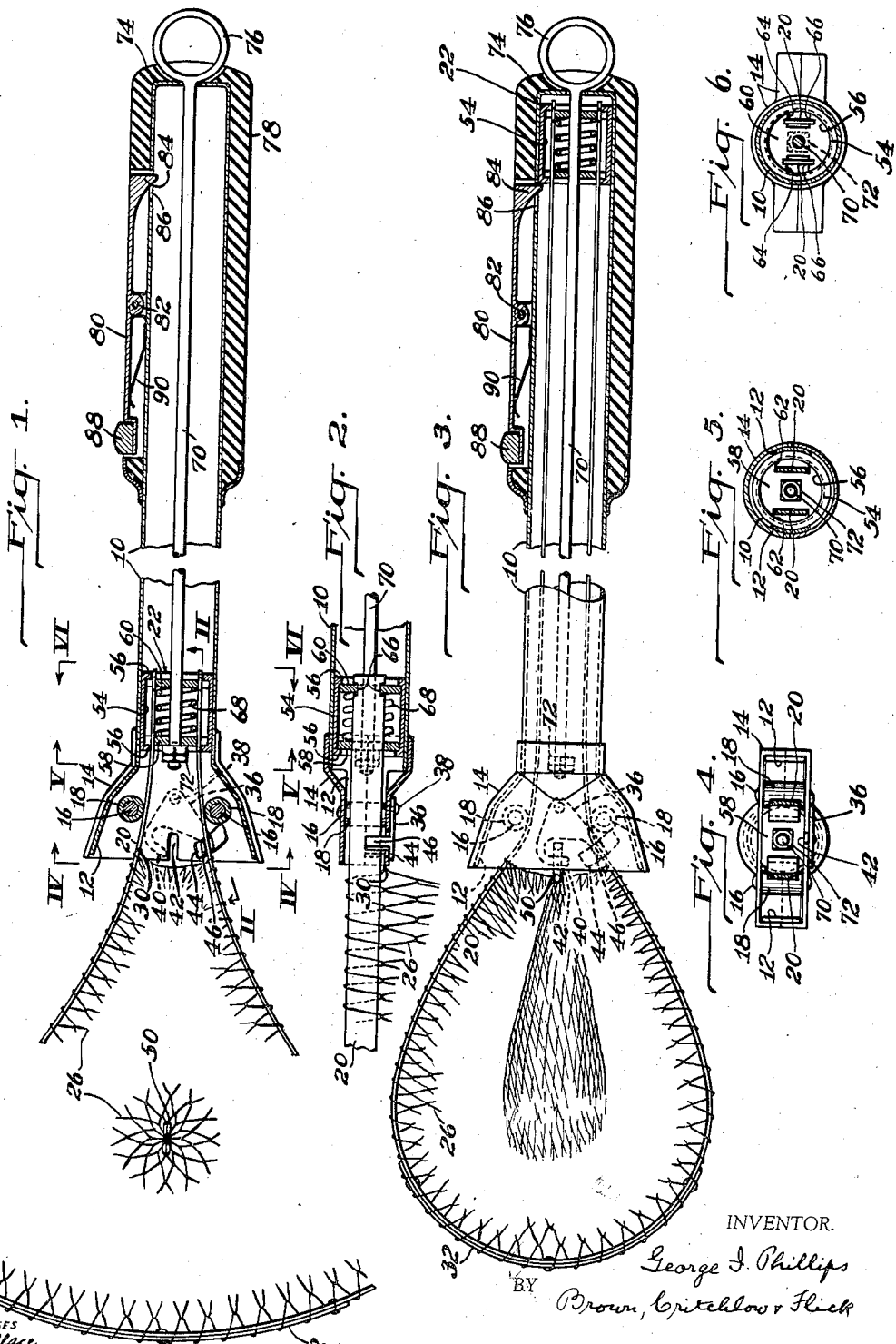
INVENTOR.
George I. Phillips
BY Brown, Critchlow & Flick
his ATTORNEYS.

Patented Apr. 26, 1938

2,115,082

UNITED STATES PATENT OFFICE 2,115,082

NET

George I. Phillips, Alexandria, Pa.

Application June 14, 1935, Serial No. 26,583

10 Claims. (Cl. 43—12)

This invention relates to nets and more particularly to expansible nets as employed for landing fish or the like.

The collapsible type of net is particularly adapted for convenience in carrying it on or about the person until used. It should be relatively compact in collapsed condition to avoid interference with the bearer or fouling on brush or similar objects and yet it should also be adapted for quick opening when needed and must be strong and serviceable upon being expanded.

Prior to my invention several types of collapsible fishing nets have been proposed. Many of these include a hollow tube into which the net and the net-holding frame may be retracted when the net is collapsed. The net-holding frame has usually been hinged or made in several parts to facilitate the collapsing operation. Hinging of the frame has weakened it and is undesirable. Making the net-supporting frame in several parts defeats quick opening of the net and renders it merely a smaller package to carry. Moreover, stuffing the net into the hollow tube handle necessitates a handle of considerable size and likewise slows up the collapsing and the expansion of the net which is very apt to become tangled. As a matter of fact most so-called expansible nets need a throwing or shaking action to expand them and straighten the net. Thus substantially all of the prior structures with which I am familiar are open to the objection that the expanding of the net is difficult and time-consuming which becomes of paramount importance where, for example, the fisherman is holding his rod in one hand and playing a fish and trying to expand the landing net with his other hand.

It is the object of my invention to avoid and overcome the foregoing and other difficulties of prior known structures and to provide a strong and rugged net when expanded, and one in which expansion is instantly and positively obtained with one hand and collapsing is substantially instantly effected to compact the net to dimensions convenient for carrying.

The stated object of the invention is achieved by the provision of a net structure having a tube slidably receiving a plug to which are secured the ends of a loop of a flat spring strip of metal so that the plug when at the outer end of the tube supports the spring loop as a net-holding frame. When the plug is at the inner or handle end of the tube, to which it can be moved by a rod and held in position by a trigger, the net is collapsed. The collapsing action of the net is readily obtained in that the net proper is merely slidably carried on the spring strip frame and secured to the end of the tube. Thus the net is in proper position whether the structure is expanded or collapsed and the net will not pull back into the tube during collapsing. From the collapsed position the net can be quickly expanded by merely releasing the trigger catch holding the plug at the handle end of the tube because the inherent resiliency of the spring strip causes the net to snap to fully expanded position. Suitable means are provided to hold the bottom tip of the net up at the outer end of the tube when the net is collapsed, this means releasing the tip of the net when the structure is expanded. Various other features of novelty will become apparent as the description proceeds.

One embodiment of my invention is illustrated in the accompanying drawing, wherein Fig. 1 is a plan view of my improved net structure in expanded position, with portions of the view being broken away and shown in section to better illustrate the construction of the net; Fig. 2 is a longitudinal cross-sectional view taken on line II—II of Fig. 1 and shows how the net-holding frame is secured to the handle; Fig. 3 is a view similar to Fig. 1 but illustrates the net in the collapsed position; Fig. 4 is a transverse, cross-sectional view taken on line IV—IV of Fig. 1 and illustrates the rolling support for the net frame at the outer end of the tube handle; Fig. 5 is a transverse, cross-sectional view taken on line V—V of Fig. 1 and illustrates the construction of the plug securing the ends of the net-holding frame; Fig. 6 is a transverse, cross-sectional view taken on line VI—VI of Fig. 1 and illustrates features of the plug construction.

Referring to the drawing, the particular embodiment of my invention illustrated in detail includes a tube 10 preferably of light weight metal but of any suitable material which is preferably formed with finger-like extensions 12 at its outer end which are surrounded by a flared or funnel-like ferrule 14. The flared ferrule 14 is formed in two flattened halves which are secured together as best seen in Fig. 4 by bolts or rivets 16. The bolts 16 serve also to journal rollers 18 which provide a rolling support for a flat spring metal strip 20 having its ends secured in a plug, designated generally by the numeral 22, which is slidably carried in the bore of tube 10.

The spring strip 20 serves as the frame or hanger for a net 26 of the usual conical form. The net is secured at its upper end to the spring strip 20 by merely passing the strip through the loops or hem formed at the top of the net as shown, or by the use of metal rings surrounding the strip and sewn to the net. By this arrangement the net may slide easily upon the spring strip 20 which permits the collapsing and expanding of the metal frame as hereafter more fully explained. The side of the net adjacent the flared ferrule 14 is fastened thereto, as shown at 30, which serves to position the net quite evenly on the spring strip 20 regardless of whether it is expanded or contracted.

An important feature of the invention is the provision of one or more spring leaves 32 which are secured to the spring strip 20 by suitable clips or rivets in order to strengthen it. In the form of the invention illustrated a spring leaf 32 is secured to the spring strip 20 only adjacent its outer portion. This spring leaf 32 not only prevents such bending of the spring strip 20 during the collapsing of the net as would permanently set the strip but likewise serves to provide additional resiliency to effect a quick expansion of the net when it is released from collapsed position.

Mechanism is provided for holding the lower tip of the net adjacent the tube 10 when the net is collapsed with the mechanism functioning automatically to release the tip of the net when the structure is expanded. This mechanism in the embodiment of the invention shown comprises a pawl 36 pivotally secured as at 38 to one side of the flared ferrule 14. The pawl 36, as best seen in Figures 1 and 2, is formed with an extending finger 40 which bridges a slot 42 in the flat portion of the flared ferrule 14. An aperture 44 is likewise formed in the flat portion of the ferrule 14 and the pawl 36 is provided with lugs 46 extending perpendicular to the main portion of the pawl 36. The lugs 46 engage on either side of the metal strip 20 so that, as seen in Figures 1 and 3, the finger 40 is moved to bridge the slot 42 when the net is in the collapsed position. But when the net is expanded the spring strip 20 is moved to the position shown in Fig. 1 to pivot pawl plate 36 so that finger 40 is moved to the side of slot 42.

A ring 50 is secured to the lower tip of the net and when the net is in the collapsed position this ring 50 is held by the finger 40 of the pawl 36 in the slot 42 of the flared ferrule. However, when the structure is expanded, as described just above, the ring 50 is released permitting the tip of the net to drop.

The plug shown generally at 22, which holds the ends of the spring strip 20, may take a plurality of forms. In the construction illustrated, however, a short length of tubing 54 is provided having small bent-over flanges 56 formed at its ends. The ends of the metal strip 20 are secured in the tubing 54 of the plug 22 in any suitable manner as, for example, through the agency of a pair of discs 58 and 60. The disc 58 is provided with diametrically opposed slots 62 which receive the full width of the metal strip 20 as best seen in Fig. 5. Disc 60, however is provided with narrower diametrically opposed slots 64 which receive the ends of the metal strip 20 which are notched as at 66 (see Fig. 2). A compression coil spring 68 is positioned between the discs 58 and 60 and serves to hold them firmly in place against the flanges 56 formed on the end of the tubing plug 54. Spring 68 also functions as a cushion or a resilient stop for the plug 22 at the end of its outward or net expanding movement as hereafter more fully described.

The discs 58 and 60 are provided with a central aperture which slidably receives a rod 70 extending axially of the tube 10 to and through a central hole in a cap 74 closing the handle end of the tube. Nuts 72 or other fastening means are provided at the outer end of the rod 70 to limit the movement of the plug 22 on the rod 70 and the rod is formed with a ring 76 at its handle end whereby the rod can be operated. The outward or expanding movement of the plug 22 is limited or controlled by the rod 70 as is evident from Fig. 1.

Surrounding the tube 10 at the inner or handle end is a grip 78 made of cork, bakelite or other suitable material. Associated with the grip 78 is suitable trigger mechanism for holding the plug 22 in its retracted or collapsed position and in the embodiment of the invention shown this mechanism includes a trigger 80 pivotally secured as at 82 to the tube 10. The grip 78 is suitably slotted to receive the trigger 80. The trigger 80 is formed with an inwardly extending cam end 84 which is received in a slot 86 formed in the wall of the tube 10. The contour of the cam end 84 permits the plug 22 to slide by it to the handle end of the tube 10 with a tilting of the trigger but prevents forward movement of the plug unless the trigger is positively released. The other end of the trigger 80 is provided with a raised button 88 which permits ready operation of the trigger by compressing movement of the thumb of the user. The trigger 80 is resiliently held with the button 88 outwardly and with the cam end portion 84 extending inwardly through the slot 86 by resilient means such as a leaf spring 90 secured to the tube 10 and pushing outwardly against the trigger 80 near the button 88.

It is believed that the operation of the improved net will be apparent from the foregoing description. However, referring to Figs. 1 and 3, and briefly reviewing the operation, when the net is in the collapsed position shown in Fig. 3 the button 88 on the trigger 80 need only to be depressed to move the cam portion 84 of the trigger away from behind the plug 22. This permits the plug 22 to move forward in the tube 10 under the inherent expanding resiliency of the metal strip 20 and the associated leaf 32 so that the net snaps out to fully expanded position instantaneously without the operator needing to assist it in any manner. The free expansion of the structure is aided by the provision of the rollers 18 contacting with the metal strip 20 at the flared ferrule 14 and reducing the frictional resistance to expansion. As the plug 22 reaches the outward end of its travel limited by the position of the nuts 72 on the rod 70 the spring 68 in the plug cushions the stopping of the plug and reduces noise and eliminates breakage.

During the outward or expanding movement of the net structure the pivoted pawl 36 turns as controlled by the lugs 46 engaging the strip 20 to release the ring 50 secured to the lower tip of the net 26. Thus the whole net is substantially instantaneously ready for use.

In collapsing the net from the position shown in Fig. 1 the ring 76 on the rod 70 is grasped and pulled axially from the tube which pulls the plug 22 backwardly in the tube 10 until it slides under the cam portion 84 of the trigger 80 with the trigger locking in front of plug 22 as shown in Fig. 3. The rod 70 is then pushed back into the tube to the position seen in Fig. 3. With the net in the collapsed position the ring 50 secured to the tip of the net 26 is grasped and moved into slot 42 formed in the flared ferrule 14 and the side of the metal strip 20 engaged by the lugs 46 is bent inwardly by the operator so that the ring 50 catches behind the finger 40 formed on pawl 36. The metal strip is then released and the ring is held in the slot as heretofore described until the net is again expanded when the ring will be dropped from the slot.

From the foregoing description of the structure and operation of one particular embodiment of my invention it will be recognized that an expansible net structure has been provided in which the expanding action is instantaneous and is controlled solely by the depressing of a button. The net when expanded is relatively strong and is adapted for hard usage. The structure can be substantially instantaneously collapsed with a minimum of effort and when collapsed comprises a compact, non-fouling structure. The construction of the net facilities the taking apart and assembly thereof for cleaning, inspection and repair.

Although my improved net structure is particularly adapted for use in fishing it may also be employed as a net for catching butterflies, birds or for other suitable purposes.

While in accordance with the patent statutes one form of my invention has been illustrated and described in detail it will be appreciated that the invention is not limited thereto or thereby but is defined in the appended claims.

I claim:

1. A net comprising a tube, a hand grip on the tube, a plug slidably carried in the tube, a net frame of spring metal strip in the form of a loop and secured at its ends to the plug, said frame resiliently holding the plug at the end of the tube opposite the hand grip and the loop in expanded position, a net slidably carried on the frame, a rod extending axially through the tube and through the plug and adapted to pull the plug to the hand grip end of the tube and to collapse the frame in the form of a small loop, a trigger for releasably securing the plug at the handle end of the tube, and means on the tube for holding the tip of the net when the frame is collapsed and releasing it when the frame is expanded.

2. A net comprising a tube, a hand grip on the tube, a plug slidably carried in the tube, a net frame of spring metal strip in the form of a loop and secured at its ends to the plug, said frame resiliently holding the plug at the end of the tube opposite the grip and the loop in expanded position, a net slidably carried on the frame, a rod extending axially through the tube and through the plug and adapted to pull the plug to the grip end of the tube and to collapse the frame in the form of a small loop, and a trigger for releasably securing the plug at the grip end of the tube.

3. A net comprising a tube, a plug slidably carried in the tube, a net frame of spring metal strip in the form of a loop and secured at its ends to the plug, said frame resiliently holding the plug at the end of the tube and the loop in expanded position, a net slidably carried on the frame, a rod extending axially through the tube and through the plug and adapted to pull the plug to the other end of the tube and to collapse the frame in the form of a small loop, and a trigger for releasably securing the frame in collapsed position.

4. In an expansible net structure, a handle, a resilient metal loop, a net supported on the loop, means for contracting the loop to relatively small size to collapse the net, means for locking the net in the collapsed position, means for releasing the locking means whereby the resiliency of the loop will cause it to snap to expanded size, means for cushioning the expansion of the loop, and means for holding a portion of the net when the loop is in its collapsed position and for releasing the net portion when the loop moves to expanded position.

5. In a collapsible net structure, a hollow handle, a resilient metal loop carried by the handle, a net supported on the loop, means for contracting the loop to relatively small size by pulling a considerable portion thereof into the hollow handle to collapse the net, means for locking the net in the collapsed position, means for releasing the locking means whereby the resiliency of the loop will cause it to snap to expanded size, and means for cushioning the expansion of the loop.

6. In an expansible net structure, a resilient metal loop, a net supported on the loop, means for contracting the loop to relatively small size to collapse the net, and means for holding the net when the loop is in its collapsed position and for releasing the net when the loop moves to expanded position.

7. An expansible net including a hollow handle, a net-supporting loop of flat spring metal extending from the handle and having its ends secured in the handle, said spring being formed of a plurality of laminated leaves, means for changing the position of the securing means in the handle to move the loop from a small collapsed position to a relatively large expanded position, and rotatable means supporting the loop in the handle to reduce friction in expanding and contracting the loop and so that the loop will move to expanded position by its own resiliency unless held in contracted position.

8. An expansible net including a handle, a net-supporting loop of flat spring metal extending from the handle and having its ends secured on the handle, means for changing the position of the securing means on the handle to move the loop from a small collapsed position to a relatively large expanded position, and rotatable means supporting the loop on the handle to reduce friction in expanding and contracting the loop and so that the loop will move to expanded position by its own resiliency unless held in contracted position.

9. In combination, a loop of radially resilient but axially rigid spring metal, a net secured to the loop, means for supporting the loop, means for moving the loop into its supporting means to reduce the size of the loop, means for releasably securing the loop in its reduced position, and means for releasably securing the tip of the net to the supporting means only when the loop is in its reduced position.

10. A net structure including a handle, a self-expansible frame secured to the handle, means for pulling the frame to a collapsed position with a considerable portion thereof being inside the handle, means for releasably locking the frame in the collapsed position, said frame when in the collapsed position having a relatively small loop extending out of the handle and of a strength and so positioned as to pull the rest of the frame out of the handle when the locking means are released, a net, means slidably supporting the net on the frame, and means securing part of the net to the handle so that when the frame is collapsed the net is carried only by the small loop but when the frame is expanded the net distributes itself over the large loop then formed.

GEORGE I. PHILLIPS.